March 5, 1935.  O. H. BLACKWOOD  1,993,315
GAS MANUFACTURE
Filed July 12, 1929   2 Sheets-Sheet 1
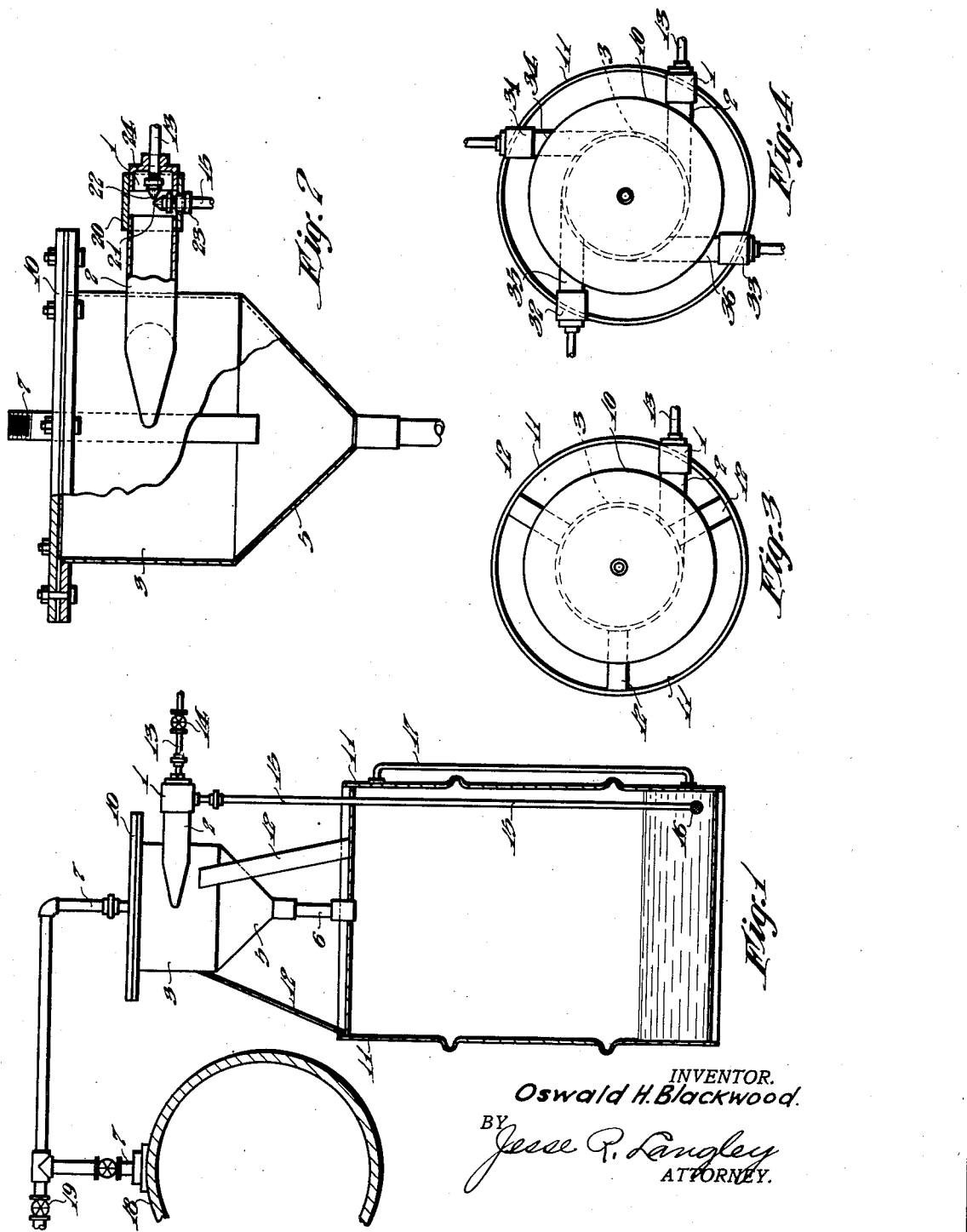
INVENTOR.
Oswald H. Blackwood.
BY Jesse R. Langley
ATTORNEY.

March 5, 1935.　　O. H. BLACKWOOD　　1,993,315
GAS MANUFACTURE
Filed July 12, 1929　　2 Sheets-Sheet 2

INVENTOR.
Oswald H. Blackwood.
BY Jesse R. Langley
ATTORNEY

Patented Mar. 5, 1935

1,993,315

UNITED STATES PATENT OFFICE 1,993,315

GAS MANUFACTURE

Oswald H. Blackwood, Pittsburgh, Pa., assignor to The Koppers Company of Delaware, a corporation of Delaware Application July 12, 1929, Serial No. 377,664

7 Claims. (Cl. 48—190)

This invention relates to the injection of oil fog or vapor into the gas stream of mains used in the distribution of city gas.

The customary methods of producing an oil fog for the purpose of lubrication of gas mains are by vaporization, use of spray nozzles, and atomization by compressed gases. When oil is atomized by any of these methods and injected into the gas stream, it is found that most of the oil particles settle out of the gas very quickly and that only a small fraction of the oil originally atomized into the gas is carried an appreciable distance from the point of injection.

Accordingly, to obtain any quantity of oil fog fine enough to be carried to remote parts of the distribution system, large quantities of oil must be atomized and most of this oil (about 99%) must be pumped from the distribution piping at the nearby drips.

I have found that if the oil is atomized into a settling or separating chamber and the fog produced is led from this chamber into the gas stream so that those particles which would quickly settle out in the mains are left behind, most of the fog thus injected into the gas stream remains suspended for a long time and is carried long distances into the system.

In the drawings,

Figures 1 is an elevation partly in section of apparatus for injecting oil fog into a gas main;

Fig. 2 is an enlarged elevation, partly in cross section of the separating chamber and atomizer;

Fig. 3 is a plan view of the separating chamber;

Fig. 4 is a view, similar to Fig. 3, of a modified form of separating chamber;

Figure 6:
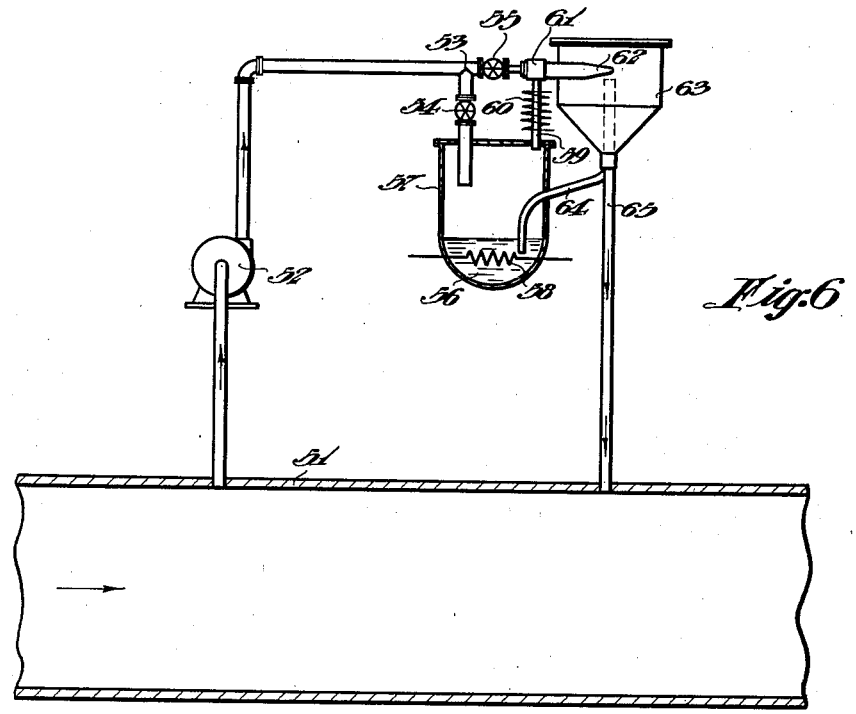
Fig. 6 is a vertical cross section through a modification in which the oil is vaporized by means of heat.

As shown in Figs. 1, 2 and 3, an atomizer 1 projects a fog or spray of finely divided oil particles through a pipe 2 tangentially into a separating chamber 3 in which the gas whirls rapidly in a circular path in the manner of a vortex. The larger spray particles impinge on the walls of the chamber and flow along the conical bottom 5 to pipe 6. The finer particles of the fog of oil pass out through a pipe 7 which extends to the lower portion of the chamber 3.

The separating chamber 3 is provided with a flanged cover 10 and is mounted on the top of an oil drum 11 by means of brackets 12 welded to the settling chamber and to the top of the drum. A pipe 13 supplies gas under a pressure of from 20 to 80 pounds to a jet in the atomizer 1 and is controlled by valve 14. This gas after expansion carries the fog in suspension through the separating chamber.

The atomizer draws oil through a suction pipe 15 from the bottom of oil drum 11 through a filter 16. The drum is provided with an oil level glass 17. The pipe 7 leads directly into a gas main 18 and a valve 19 on the pipe 7 is used for test purposes. Pipe 6 returns any oil to the drum that collects on the walls of the separating chamber.

The atomizer 1 comprises a main body member 20 threaded directly onto pipe 2 and carries an upright nozzle 21, the end of which is exactly at the axis of body 20 of the atomizer. A second nozzle 22 is carried coaxially with the body 20 and in alignment with the end of nozzle 21.

The nozzle 21 is threaded onto the end of pipe 15 which passes through a pipe plug 23 and is held in place by welding. The end of body 20 is closed by a pipe plug 24 which is drilled to receive pipe 13 which is also held in place by welding. The strong blast of gas issuing from nozzle 22 produces suction in pipe 15, thereby supplying oil to be atomized.

The modification shown in Fig. 4 differs from that shown in the preceding figures by having a plurality of atomizers 31, 32 and 33 in addition to atomizer 1. The three additional atomizers project spray into tangential pipes 34, 35 and 36, respectively.

Figure 5:
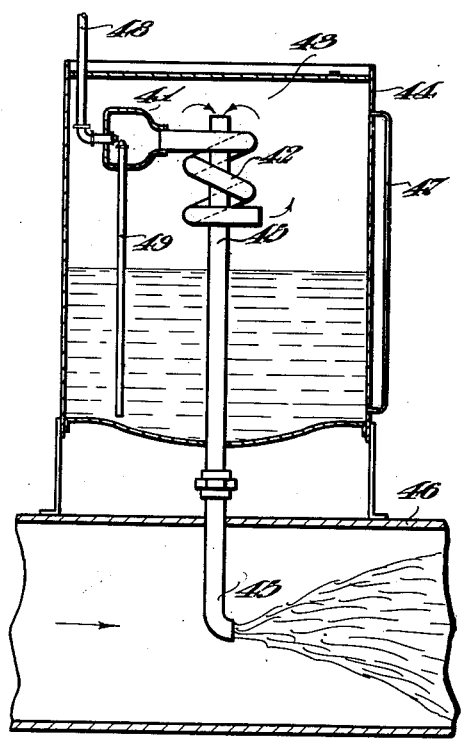
Fig. 5 is a vertical cross section of a second modification.

In the modification shown in Fig. 5, an atomizer 41 projects a fog of oil particles directly into a pipe 42 that is formed in the shape of a helix. This pipe 42 subjects the oil spray to centrifugal action, due to its spiral, helical or whirling path which causes the heavier particles to adhere to the inner surface of the tube 42. From this tube, the oil fog issues tangentially into settling chamber 43 which is the upper portion of a drum 44 where it is subjected to still further whirling action.

The fine particles of fog pass downwardly through pipe 45 into gas main 46. The drum 44 contains the supply of oil to be atomized and is provided with a gauge glass 47. The atomizer is supplied with compressed gas through pipe 48 and draws oil upwardly by suction through pipe 49.

The embodiment of the invention shown in Fig. 6 makes use of the surface of a body of hot oil for disseminating the oil through the gas instead of utilizing an atomizer. Gas is drawn from a gas main 51 by a blower 52 and the output of the blower divides at 53, part passing through hand valve 54 and part passing through hand valve 55.

That portion passing through hand valve 54 impinges on the surface of a body of oil 56 contained in a vessel 57, the oil being heated by some device such as an electric heater 58.

The gas after impinging on the oil passes out through a pipe 59 heated by an electric heating coil 60. The gas then enters a mixing chamber 61 and joins the somewhat cooler gas issuing from hand valve 55.

From the mixing chamber, the gas passes through a tangential inlet 62 into a centrifugal chamber 63 and any heavy particles of oil are caught on the sides of the chamber and returned through pipe 64 into the vessel 57. The finer particles of fog leave the whirling chamber through the pipe 65 and pass with the return stream of gas to the main.

The oil in the vessel 57 is not kept boiling, and its temperature may be as low as 70° C. below its boiling point. The gas above the surface becomes saturated or partly saturated with the oil vapors and the action is accordingly different from what it would be if the oil were boiling and the space above the oil was filled entirely with pure oil vapor.

It is possible under some conditions to operate the device with the hand valve 55 closed. This is because eddy currents exist above the surface of the oil so that one portion of the gas may become quite saturated with the oil vapor and quite heated while another portion of the gas adjacent thereto will only be slightly saturated and will also be at a lower temperature and the mixing of the two portions of gas having different temperatures and different degrees of saturation precipitates the oil vapors in the form of a fine fog.

The separation of the larger particles from those which will remain long suspended in the gas is improved if the oil spray is forced or whirled through a spiral or helical path, as illustrated. By this method centrifugal force effects a differential separation of the oil droplets, throwing out the heavy, quickly-settling particles, but has little effect on the small useful particles.

It is very convenient in oil fog lubrication of mains to be able to check the extent of the oil travel through the distribution system. For this purpose, the oil to be atomized may be dyed with any bright, colored oil-soluble dye. Samples of gas may then be withdrawn through a tar camera, (not shown), and if oil fog is present a colored stain will be found on the filter paper of the camera.

The use of such dye would be prohibitively expensive with former methods of spraying due to the large quantity of oil used which is found in nearby drips. With the improved method of oil atomization I have disclosed above, only the small amount of "permanent" fog produced goes forward, and the dye consumption is small.

In the distribution of city gas, the injection of oil fog or vapor into the gas stream is very desirable. It has been found that such a fog will alleviate naphthalene troubles, prevent dust troubles, seal minute openings in pipe joints and minimize the interior corrosion of the distribution piping and gas meters. A beneficial effect on the leather of meter diaphragms is also obtained.

Possibly the greatest advantage of the improved arangement herein described is that the oil collected in the chamber is sent back to the spray or heated body of oil and that little or no oil is wasted.

I claim as my invention:

1. Apparatus for producing oil fog and introducing it into a gas main comprising a conduit for conducting a stream of gas from said main, means for disseminating fine particles of oil through said stream of gas, a settling chamber connected with said means to receive the stream of gas containing the atomized oil from said means, means for whirling the gas containing the particles of oil entering said settling chamber, and means for directing said stream of gas from the settling chamber into said main.

2. Apparatus for producing oil fog and introducing it into a gas main and comprising means for diverting a stream of gas from said main, an atomizer for oil located in the stream of gas, a separating chamber, a pipe for conveying the stream of gas from the atomizer and connected to the separating chamber tangentially, and means for directing said stream of gas into said main.

3. Apparatus for producing oil fog and introducing it into a gas main comprising a pipe for diverting gas from the main, an atomizer for oil located in the pipe, a settling chamber, said pipe being connected to the settling chamber tangentially and a pipe leading from the center of the settling chamber to the gas main.

4. Apparatus for producing oil fog and introducing it into a gas main comprising means for diverting a stream of gas from the gas main, means for disseminating oil particles in the stream of gas from said main, means for imparting a whirling motion to the gas stream after the oil has been disseminated therein, and means for returning said gas stream laden with oil particles to said main for lubricating the latter.

5. Apparatus for producing oil fog and introducing it into a gas main comprising means for diverting gas from the main, means for disseminating oil particles through the gas thus diverted, means for causing the diverted gas and disseminated oil particles to travel in a spiral path, and means for returning said diverted gas to said main whereby the latter is lubricated by the disseminated oil.

6. Apparatus for producing oil fog for gas mains which comprises a closed vessel for oil having heating means for heating oil in the vessel, means for conducting a stream of gas in contact with the heated oil to collect vapor therefrom, means for providing a stream of gas which is cool relative to the oil vapor from said vessel, means for conducting the vapor bearing gas into the means for providing a stream of cool gas to condense the vapor into a fog, means for conducting the fog-laden gas into a settling chamber, and a conduit connecting the settling chamber with a gas main.

7. Apparatus for producing oil fog for gas mains which comprises a vessel for oil having heating means for heating oil in the vessel, means for conducting a stream of gas in contact with oil in said vessel to collect vapor therefrom, means for superheating the vapor-bearing gas issuing from said vessel, means for thereafter cooling the superheated gas, and means for conducting the cooled gas and resultant oil fog into a gas main.

OSWALD H. BLACKWOOD.